(12) United States Patent
Steiner

(10) Patent No.: US 7,196,844 B2
(45) Date of Patent: Mar. 27, 2007

(54) IMAGING OPTICAL DEVICE, IN PARTICULAR BINOCULARS OR TELESCOPE

(75) Inventor: Carl Steiner, Bindlach (DE)

(73) Assignee: Steiner-Optik GmbH, Bayreuth (DE)

( * ) Notice: Subject to any disclaimer, the term of this patent is extended or adjusted under 35 U.S.C. 154(b) by 252 days.

(21) Appl. No.: 10/825,419

(22) Filed: Apr. 16, 2004

(65) Prior Publication Data
US 2004/0207917 A1  Oct. 21, 2004

(30) Foreign Application Priority Data
Apr. 16, 2003  (DE) .............................. 103 17 483

(51) Int. Cl.
*G02B 23/00*  (2006.01)
*G02B 15/14*  (2006.01)
(52) U.S. Cl. ................... 359/410; 359/407; 359/425
(58) Field of Classification Search ........ 359/399–410, 359/694–706, 407–426, 480–482; 250/201.3
See application file for complete search history.

(56) References Cited

U.S. PATENT DOCUMENTS

| | | | |
|---|---|---|---|
| 5,235,458 A | 8/1993 | Akagi et al. | 359/410 |
| 5,587,846 A | 12/1996 | Miyano et al. | 359/824 |
| 5,859,733 A * | 1/1999 | Miyano et al. | 359/824 |
| 6,115,554 A * | 9/2000 | Ito | 396/106 |
| 6,172,360 B1 * | 1/2001 | Khovaylo et al. | 250/235 |
| 6,317,199 B1 | 11/2001 | Suzuki | 356/4.01 |
| 6,459,857 B2 * | 10/2002 | Kawamura et al. | 396/374 |

FOREIGN PATENT DOCUMENTS

DE  198 23 076 A1  11/1998

* cited by examiner

Primary Examiner—Thong Q. Nguyen
(74) Attorney, Agent, or Firm—Browdy and Neimark, PLLC

(57) ABSTRACT

An imaging optical device, in particular binoculars or a telescope, comprises, in addition to a casing, an optical system with at least two optical components, the distance of which relative to one another is adjustable for focus setting of the optical system. This adjustment is effected by an adjusting device, which is coupled with at least one of the two components. The position of the optical components relative to each other is detected and, by the aid of a processor, converted into a focal length of the optical system and then outputted as a focal length via an output device. In this way, the distance of an object sighted by the optical device can be determined conveniently.

8 Claims, 4 Drawing Sheets

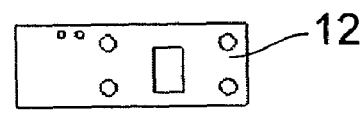
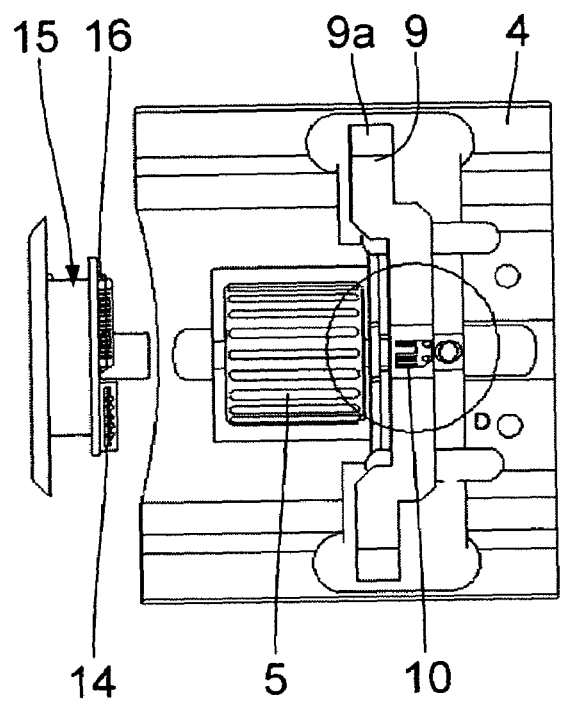
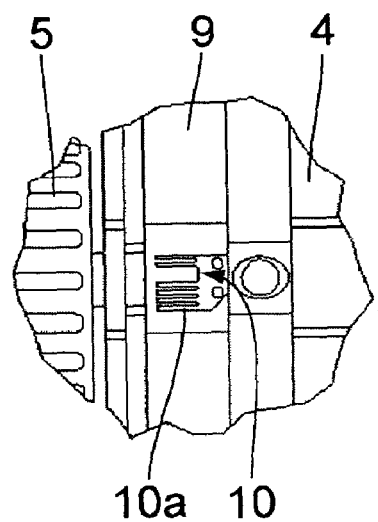

IMAGING OPTICAL DEVICE, IN PARTICULAR BINOCULARS OR TELESCOPE

BACKGROUND OF THE INVENTION

1. Field of the Invention

The invention relates to an imaging optical device, in particular binoculars or a telescope.

2. Background Art

Optical devices of the generic type in lots of designs have been known from prior public use. For focus setting, i.e. setting the object focal length to be equal to the distance of an object, many of these known optical devices comprise, within the optical system, optical components that are adjustable by an adjusting device. In this way an object that has been sighted can be brought into focus.

There is a demand for more convenient design of the known optical devices.

SUMMARY OF THE INVENTION

According to the invention, attained by an imaging optical device comprises a casing; an optical system having at least two optical components, the distance of which relative to each other being adjustable for focus setting of the optical system; an adjusting device, which is coupled with at least one of the two optical components, for regulation of the distance between the two optical components; a detection device for detecting the position of the optical components relative to one another, a processor which is in signaling connection with the detection device for conversion of position data obtained from the detection device into a focal length of the optical system; an output device which is in signaling connection with the processor for readable display of the converted focal length; and an energy-supply device, in particular at least one battery, for the detection device, the processor and the output device.

According to the invention it has been found that, by way of the detectable relative position of the optical components, which are adjustable for focus setting of the optical system of the optical device, the focal length that is allocated to each position of the optical components relative to each other can be computed and expressed through conversion. This conversion is known from the equally known optical design of the optical system. This increases the convenience of handling the optical device considerably, a user being able, after focusing an object sighted by the optical device, automatically to read off his distance from this object.

The adjusting device comprises a movable adjusting body, in particular an adjusting wheel, with the detection device comprising a potentiometer pickoff which detects the current position of the adjusting body A potentiometer pickoff can be manufactured at a low cost, furnishing precise data on the current position of the adjusting body.

The structure of the potentiometer pickoff is simple: it comprises a wiper which is rigidly connected to the at least one adjustable optical component, and a wiper contact which is fixed to the casing.

An output device in the form of a liquid crystal display has little demand for energy. If necessary, such an output device may even be illuminated.

An operating button for temporary activation of the detection device and/or of the output device additionally reduces the demand for energy of the optical device. It is possible optionally to activate only the detection or output device. Isolated activation of the detection device enables the distance of a focused object to be instantaneously detected for later read-off. Isolated activation of the output device ensures instantaneous read-off of the distance which has possibly been set previously.

A ribbon cable for supply of the detection device with energy results in a compact design. It is possible in particular to employ casing constructions of optical devices that are already available.

Details of the invention will become apparent from the ensuing description of an exemplary embodiment, taken in conjunction with the drawing:

BRIEF DESCRIPTION OF THE DRAWING

FIG. 8 is an illustration similar to FIG. 5 with further components of the binoculars being omitted for clarification of further internal details;

FIG. 9 is an illustration of a wiper contact of a detection device for detecting the position of optical components of the binoculars relative to each other; and FIG. 10 is a view of details of FIG. 8 on an enlarged scale.

DESCRIPTION OF A PREFERRED EMBODIMENT

Figure 1:
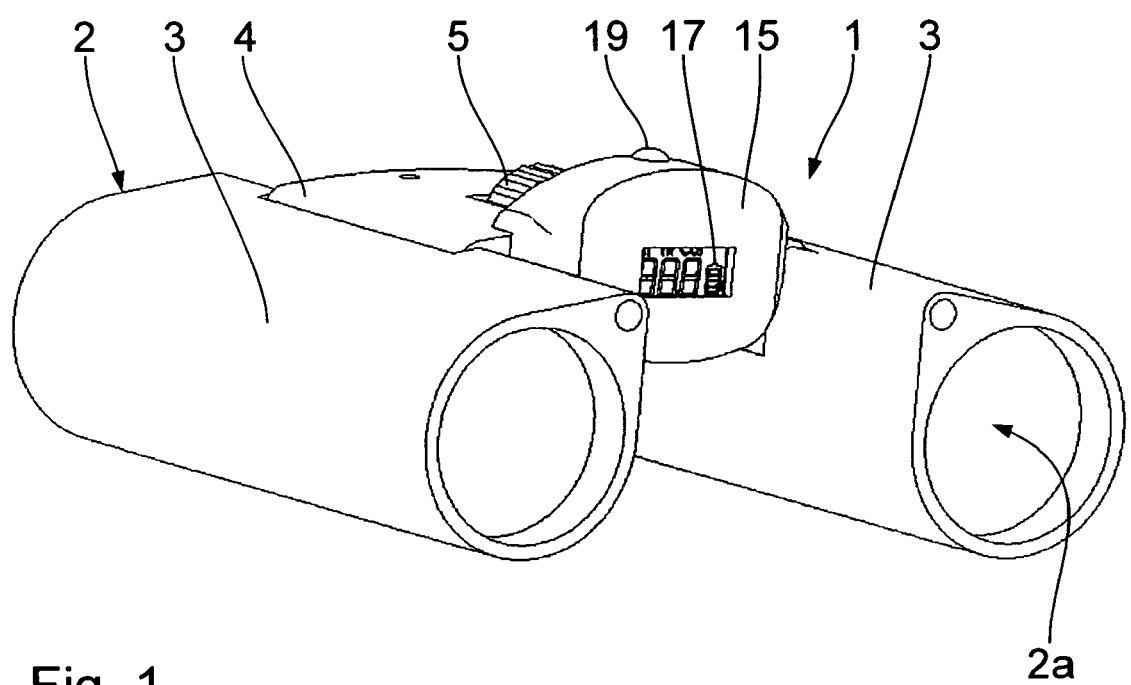
FIG. 1 is a perspective view of a pair of binoculars.

FIG. 1 illustrates a pair of binoculars designated in their entirety by 1 and, in the following, serving as an example for an imaging optical device. The binoculars 1 have a multi-piece casing 2. The casing 2 comprises two substantially tubular mounts 3 for the symmetrically spaced, optical components of an optical system 2a of the binoculars 1 as well as a bridge piece 4 which extends crosswise of the two mounts 3, uniting them. The operating portion of a focusing wheel 5 projects upwards over the bridge piece 4.

Figures 2, 3, 4:
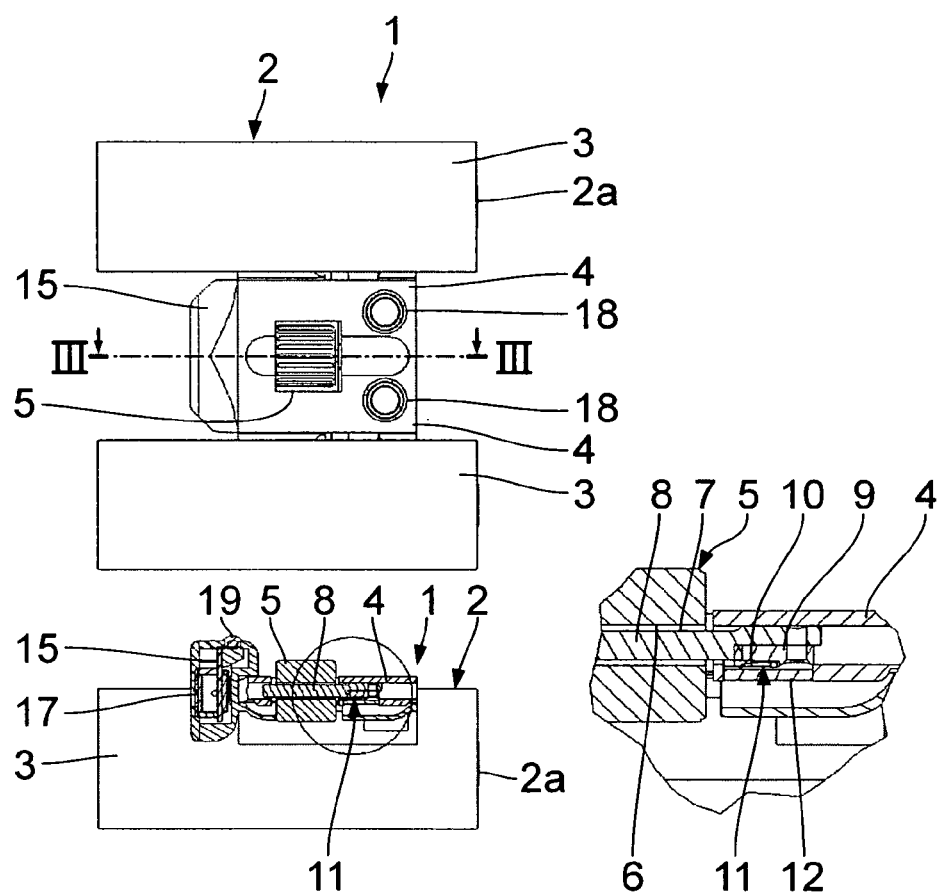
FIG. 2 is a plan view of the pair of binoculars of FIG. 1.
FIG. 3 is a sectional view on the line III—III of FIG. 2 on an enlarged scale.
FIG. 4 is a view of details of FIG. 3 on an enlarged scale.
Figure 5:
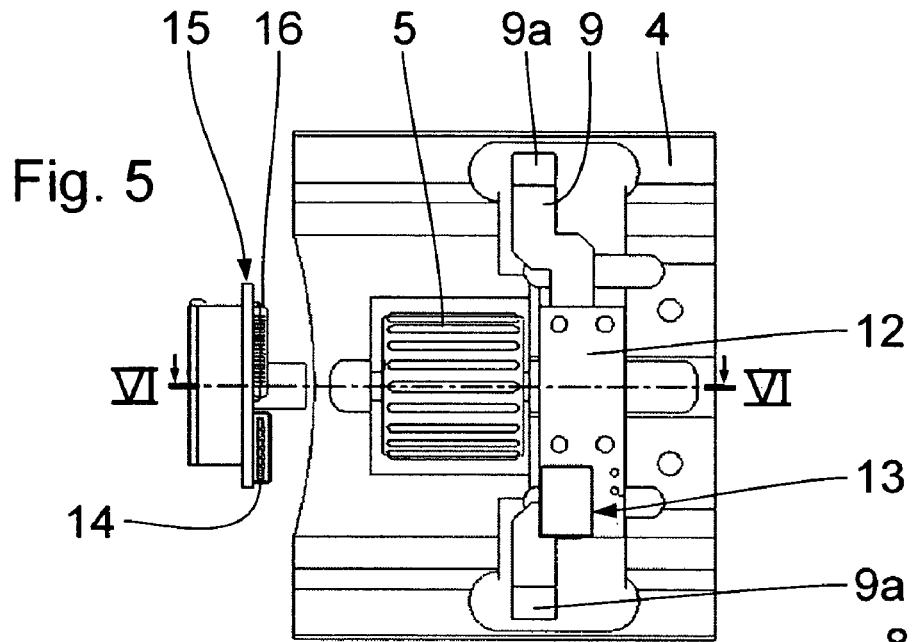
FIG. 5 is a illustration, seen from below, of internal details of a bridge piece of the binoculars.
Figure 6:
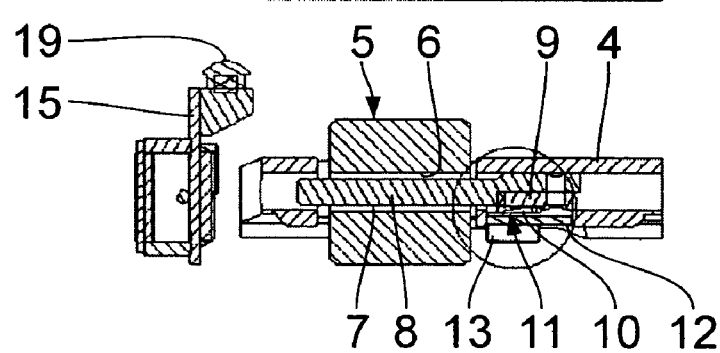
FIG. 6 is a sectional view on the line VI—VI of FIG. 5.
Figure 7:
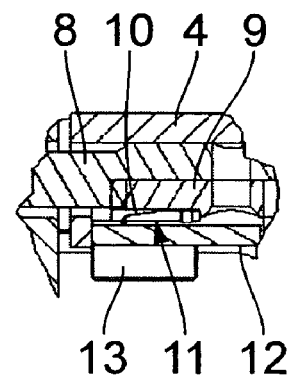
FIG. 7 is a view of details of FIG. 6.

As seen in particular in FIGS. 3 and 6, the focusing wheel 5 has an internal thread 6 which engages with a complementary external thread 7 of a focusing setscrew 8. An adjusting bar 9 is centrally fixed to the focusing setscrew 8, extending crosswise of the longitudinal axis of the setscrew 8. The free ends 9a of the adjusting bar 9 are each provided with a lens of the two symmetrical optical arrangements of the optical system 2a of the binoculars 1.

A wiper 10 of a potentiometer pickoff 11 is rigidly centrally joined to the adjusting bar 9, detecting the position of the adjusting bar 9 relative to the rigid portion of the bridge piece 4 of the casing 2. By way of five parallel contact fingers 10a, the wiper 10 is electrically connected to a wiper contact 12 fixed to the casing. The wiper contact 12 is in signalling connection with an electronic unit 15 via a plug contact and a ribbon cable 13 (seen only in part in the drawing) and another plug contact 14 of the electronic unit 15. A processor 16 is part of the electronic unit 15. A liquid crystal display 17 forms another part of the electronic unit 15.

Energy is supplied to the potentiometer pickoff 11 and the electronic unit 15 via a supply line (not shown) by the aid of two batteries 18 that are accommodated in the bridge piece 4. The electronic unit 15 is operated by an operating button 19 which projects upwards over the casing of the electronic unit 15.

A distance measurement by means of the binoculars 1 takes place as follows: A user aims the binoculars 1 at the object, the distance of which from the user is to be determined, and, by the aid of the focusing wheel 5, regulates the optical arrangement of the binoculars 1 for focusing the object. To this end, he turns the focusing wheel 5 so that, via the mechanical coupling of the focusing wheel 5 by way of the focusing setscrew 8, the adjusting bar 9 and the optical components mounted on the free ends 9a, the distance of these optical components from neighboring optical components of the optical system 2a is regulated for focus setting of the optical system 2a of the binoculars 1. The focusing wheel 5 therefore serves as an adjusting device for focus setting. The position of the adjusting bar 9 relative to the rigid portion of the bridge piece 4 of the casing 2, and thus the position of the adjustable optical components within the optical system 2a, are detected by way of the potentiometer pickoff 11. It serves as a device for detection of the position, relative to one another, of the optical components of the optical system 2a of the binoculars 1.

A voltage, allocated to this relative position, of the potentiometer pickoff 11 is transmitted via the ribbon cable 13 to the processor 16 of the electronic unit 15. By the aid of a calibration table previously recorded in a non volatile memory of the electronic unit 15, the processor 16 converts the voltage of the potentiometer pickoff 11, i.e. the position data obtained therefrom, into a focal length of the binoculars 1 that is allocated to the current position of the optical components. The converted focal length is then transmitted by the processor 16 to the liquid crystal display 17. This is where the current focal length, and consequently the user's distance from the focused object, is expressed for example in meters and centimeters. The liquid crystal display 17 serves as an output device, readably expressing the focal length converted by the processor.

Once the binoculars 1 have been focused on the object, the distance of which is to be determined, the user can trigger the liquid crystal display 17 by means of the operating button 19. Moreover, by means of the operating button 19, the user can select the accuracy of display and the type of unit shown (meter/foot). The liquid crystal display 17 further comprises battery reading for current-battery-charge feedback.

Prior to the process of distance measurement, the binoculars 1 may be adapted to a user's possible eye defect. To this end, the optical system 2a is regulated for infinity focusing on both sides of the binoculars 1. This may be done by sighting for example an object that is far away and has resolvable details. Then distance measurement takes place as described above.

Switching the binoculars 1 from a mode of distance measurement to a calibration mode for correction of a user's eye defect or for calibrating and producing the calibration table can equally be effected by means of the operating button 19.

What is claimed is:

1. An imaging optical device comprising:
    a casing (2);
    an optical system (2a) having at least two optical components, the distance of which relative to each other is adjustable for focus setting of the optical system (2a);
    an adjusting device (5), which is coupled with at least one of the two optical components, for regulation of the distance between the two optical components;
    a detection device (11) for detecting the position of the optical components relative to one another;
    a processor (16) which is in signalling connection with the detection device (11) for conversion of position data obtained from the detection device (11) into a focal length of the optical system;
    an output device (17) which is in signalling connection with the processor (16) for readable display of the converted focal length; and
    an energy-supply device for the detection device (11), the processor (16) and the output device (17);
    wherein the adjusting device comprises a focusing wheel,
    the detection device (11) comprises a potentiometer pickoff which detects the current position of the focusing wheel, and
    wherein the potentiometer pickoff of the detection device (11) comprises a wiper (10) which is rigidly connected to an adjusting bar which is provided with the at least two optical components, and a wiper contact (12) which is fixed to the casing (2).

2. An optical device according to claim 1, wherein the energy supply device comprises at least one battery (18).

3. An optical device according to claim 1, wherein the output device (17) is a liquid crystal display.

4. An optical device according to claim 1, comprising an operating button (19) for temporary activation of the detection device (11).

5. An optical device according to claim 1, comprising an operating button (19) for temporary activation of the output device (17).

6. An optical device according to claim 1, comprising an operating button (19) for temporary activation of the detection device (11) and the output device (17).

7. An optical device according to claim 1, wherein supply of the detection device (11) with energy takes place via a ribbon cable (13).

8. Binoculars (1) comprising:
    a casing (2);
    an optical system (2a) having at least two optical components, the distance of which relative to each other is adjustable for focus setting of the optical system (2a);
    an adjusting device (5), which is coupled with at least one of the two optical components, for regulation of the distance between the two optical components;
    a detection device (11) for detecting the position of the optical components relative to one another;
    a processor (16) which is in signalling connection with the detection device (11) for conversion of position data obtained from the detection device (11) into a focal length of the optical system;
    an output device (17) which is in signalling connection with the processor (16) for readable display of the converted focal length; and
    an energy-supply device for the detection device (11), the processor (16) and the output device (17),
    wherein the adjusting device comprises a focusing wheel,
    the detection device (11) comprises a potentiometer pickoff which detects the current position of the focusing wheel, and
    wherein the potentiometer pickoff of the detection device (11) comprises a wiper (10) which is rigidly connected to an adjusting bar which is provided with the at least two optical components, and a wiper contact (12) which is fixed to the casing (2).

* * * * *